US012672083B2

(12) United States Patent
Shin et al.

(10) Patent No.: US 12,672,083 B2
(45) Date of Patent: Jun. 30, 2026

(54) METHOD AND DEVICE FOR UPLINK TRANSMISSION AND RECEPTION IN WIRELESS COMMUNICATION SYSTEM

(71) Applicant: LG Electronics Inc., Seoul (KR)

(72) Inventors: Seokmin Shin, Seoul (KR); Haewook Park, Seoul (KR); Kijun Kim, Seoul (KR); Joonkui Ahn, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 18/262,661

(22) PCT Filed: Feb. 3, 2022

(86) PCT No.: PCT/KR2022/001705
§ 371 (c)(1),
(2) Date: Jul. 24, 2023

(87) PCT Pub. No.: WO2022/164297
PCT Pub. Date: Aug. 4, 2022

(65) Prior Publication Data
US 2024/0121737 A1 Apr. 11, 2024

Related U.S. Application Data

(60) Provisional application No. 63/192,120, filed on May 24, 2021.

(30) Foreign Application Priority Data

| | | |
|---|---|---|
| Jan. 29, 2021 | (KR) | ........................ 10-2021-0013585 |
| May 11, 2021 | (KR) | ........................ 10-2021-0060617 |
| Nov. 4, 2021 | (KR) | ........................ 10-2021-0150571 |

(51) Int. Cl.
*H04W 56/00* (2009.01)
*H04W 72/0457* (2023.01)
(Continued)

(52) U.S. Cl.
CPC ... *H04W 56/0045* (2013.01); *H04W 72/0457* (2023.01); *H04W 72/1268* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 11,368,932 B2 * | 6/2022 | Jiang | ................. H04W 56/0015 |
| 2020/0053682 A1 | 2/2020 | Abedini et al. | |

(Continued)

FOREIGN PATENT DOCUMENTS

| | | |
|---|---|---|
| KR | 10-2012-0117726 | 10/2012 |
| KR | 10-2013-0012593 | 2/2013 |

(Continued)

OTHER PUBLICATIONS

InterDigital, "Summary of [AT111][107][NTN] Pre-compensation and other MAC issues," 3GPP RAN WG2 Meeting #111e, R2-2008188, Aug. 17-28, 2020, 65 pages.

(Continued)

*Primary Examiner* — Saumit Shah
(74) *Attorney, Agent, or Firm* — Fish & Richardson P.C.

(57) ABSTRACT

Disclosed are a method and device for uplink transmission and reception in a wireless communication system. A method for a terminal to perform uplink transmission in a wireless communication system according to an embodiment of the present disclosure may comprise the steps of: receiving at least one timing advance (TA) parameter from a base station; calculating the TA on the basis of at least one valid TA parameter; and performing uplink transmission on the basis of the TA, wherein the at least one TA parameter includes at least one common TA parameter, a second common TA parameter of a second order is valid on the basis (Continued)

that the first common TA parameter of a first order is valid, and the first order is lower than the second order.

14 Claims, 12 Drawing Sheets

(51) Int. Cl.
*H04W 72/1268* (2023.01)
*H04W 84/06* (2009.01)

(56) References Cited

U.S. PATENT DOCUMENTS

| | | | | |
|---|---|---|---|---|
| 2022/0191946 A1* | 6/2022 | Nishio | .............. | H04W 74/0841 |
| 2022/0263570 A1* | 8/2022 | Wang | ................. | H04B 7/18513 |
| 2022/0386259 A1* | 12/2022 | Chen | .................. | H04B 7/18563 |
| 2023/0422195 A1* | 12/2023 | Yao | ................... | H04W 56/0045 |
| 2024/0073840 A1* | 2/2024 | Jiang | ................. | H04W 56/0045 |

FOREIGN PATENT DOCUMENTS

| | | |
|---|---|---|
| WO | WO 2020/140248 | 7/2020 |
| WO | 2020/196534 A1 | 10/2020 |

OTHER PUBLICATIONS

Extended European Search Report in European Appln. No. 22746323.9, mailed on Dec. 18, 2024, 10 pages.

MediaTek, Eutelsat, "UE Time and frequency Synchronisation for NR-NTN," R1-2100595, 3GPP TSG RAN WG1 Meeting #104e, Online, Jan. 25-Feb. 5, 2021, 17 pages.

ZTE, Sanechips, "Report of Email Discussion [106#70][NR/NTN] RACH capacity/procedures," R2-1909256, 3GPP TSG-RAN WG2 Meeting #107, Prague, Czech, Aug. 26-30, 2019, 38 pages.

* cited by examiner

- Common TA(Tcom) = 2*Do/c
- UE specific differential TA for xth UE (TUEx) = 2*(D1x-Do)/c
- Full TA(Tfull) = Tcom + TUEx (a) Regenerative payload

- Common TA(Tcom) = 2*(Do1+Do2)/c
- UE specific differential TA for xth UE (TUEx) = 2*(D1x-Do1)/c
- Full TA(Tfull) = Tcom + TUEx (b)Transparent payload

METHOD AND DEVICE FOR UPLINK TRANSMISSION AND RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/001705, filed on Feb. 3, 2022, which claims the benefit of Korean Application No. 10-2021-0150571, filed on Nov. 4, 2021, U.S. Provisional Application No. 63/192,120, filed on May 24, 2021, Korean Application No. 10-2021-0060617, filed on May 11, 2021, and Korean Application No. 10-2021-0013585, filed on Jan. 29, 2021. The disclosures of the prior applications are incorporated by reference in their entirety.

TECHNICAL FIELD

The present disclosure relates to a wireless communication system, and in more detail, relates to a method and a device of applying a time reference applied to uplink transmission or reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

Technical Problem

A technical problem of the present disclosure is to provide a method and a device of transmitting or receiving an uplink in a wireless communication system.

An additional technical problem of the present disclosure is to provide a method and a device of adjusting a time reference applied to uplink transmission or reception in a wireless communication system including a non-terrestrial network (NTN).

The technical objects to be achieved by the present disclosure are not limited to the above-described technical objects, and other technical objects which are not described herein will be clearly understood by those skilled in the pertinent art from the following description.

A method of performing uplink transmission by a terminal in a wireless communication system according to an aspect of the present disclosure includes receiving at least one timing advance (TA) parameter from a base station; calculating a TA based on at least one valid TA parameter; and performing the uplink transmission based on the TA, and the at least one TA parameter includes at least one common TA parameter, and a second common TA parameter of a second order is valid based on a first common TA parameter of a first order being valid, and the first order may be lower than the second order.

A method of receiving uplink transmission by a base station in a wireless communication system according to an additional aspect of the present disclosure includes transmitting at least one timing advance (TA) parameter to at least one terminal; and receiving from each terminal uplink transmission to which a TA based on at least one valid TA parameter is applied, and the at least one TA parameter includes at least one common TA parameter, and a second common TA parameter of a second order is valid based on a first common TA parameter of a first order being valid, and the first order may be lower than the second order.

According to the present disclosure, a method and a device of transmitting or receiving an uplink in a wireless communication system may be provided.

According to the present disclosure, in a wireless communication system including a non-terrestrial network (NTN), a method and a device of applying a time reference applied to uplink transmission or reception may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 is a diagram for describing a NTN supported by a wireless communication system to which the present disclosure may be applied.

DETAILED DESCRIPTION

Figure 1:
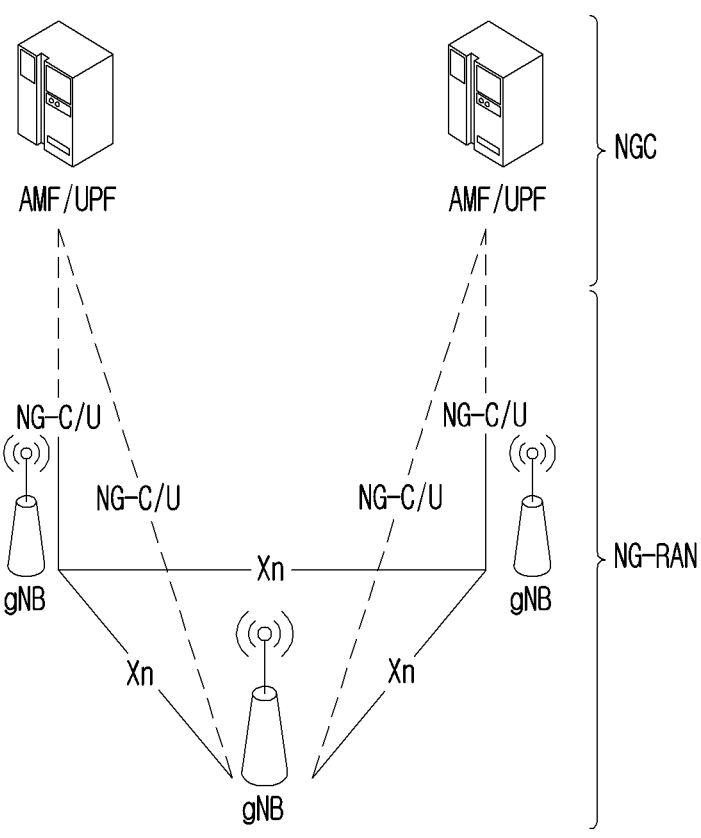
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
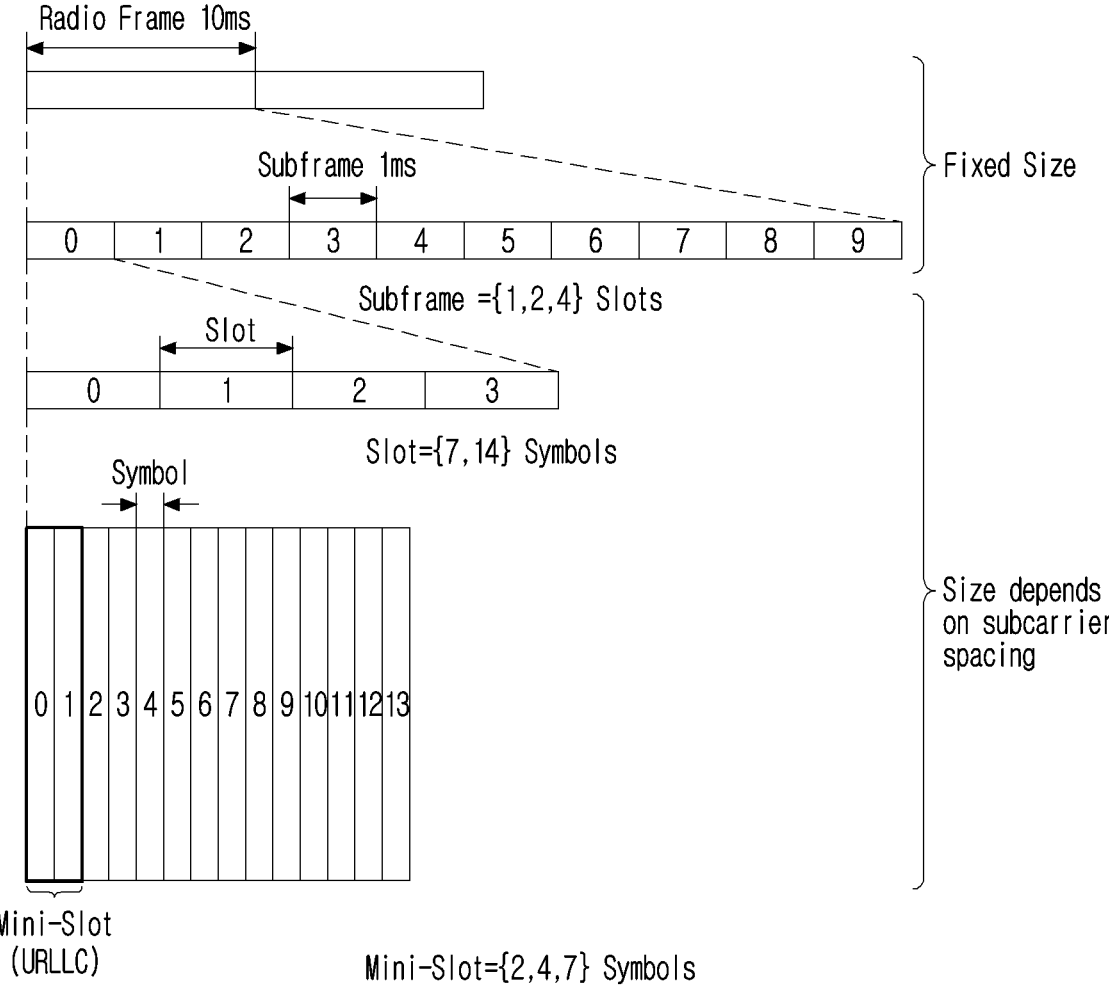
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f=2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^\mu \in \{0, \ldots, N_{slot}^{subframe,\mu}-1\}$ in a subframe and are numbered in an increasing order of $n_{s,f}^\mu\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
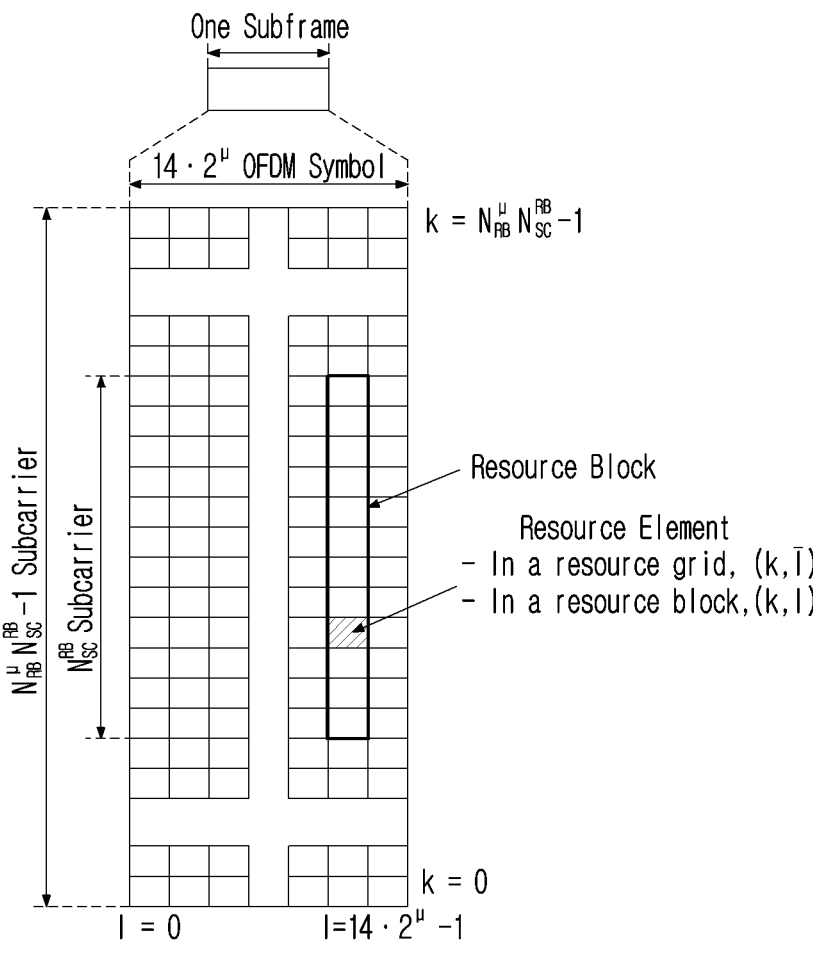
FIG. 3 illustrates a resource grid in a wireless communication system to which the present disclosure may be applied.

FIG. 2 is an example on $\mu=^2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with $14\cdot2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per and antenna port p. Each element of a resource grid for $\mu$ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2 N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for and an antenna port p corresponds to a complex value, $a_{k,l'}^{(p,\mu)}$. When there is no risk of confusion or when a specific antenna port or numerology is not specified, indexes p and may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration. The center of subcarrier 0 of common resource block 0 for a subcarrier spacing configuration is identical to 'point A'. A relationship between a common resource block number $n_{CRB}^\mu$ and a resource element (k,l) for a subcarrier spacing configuration in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
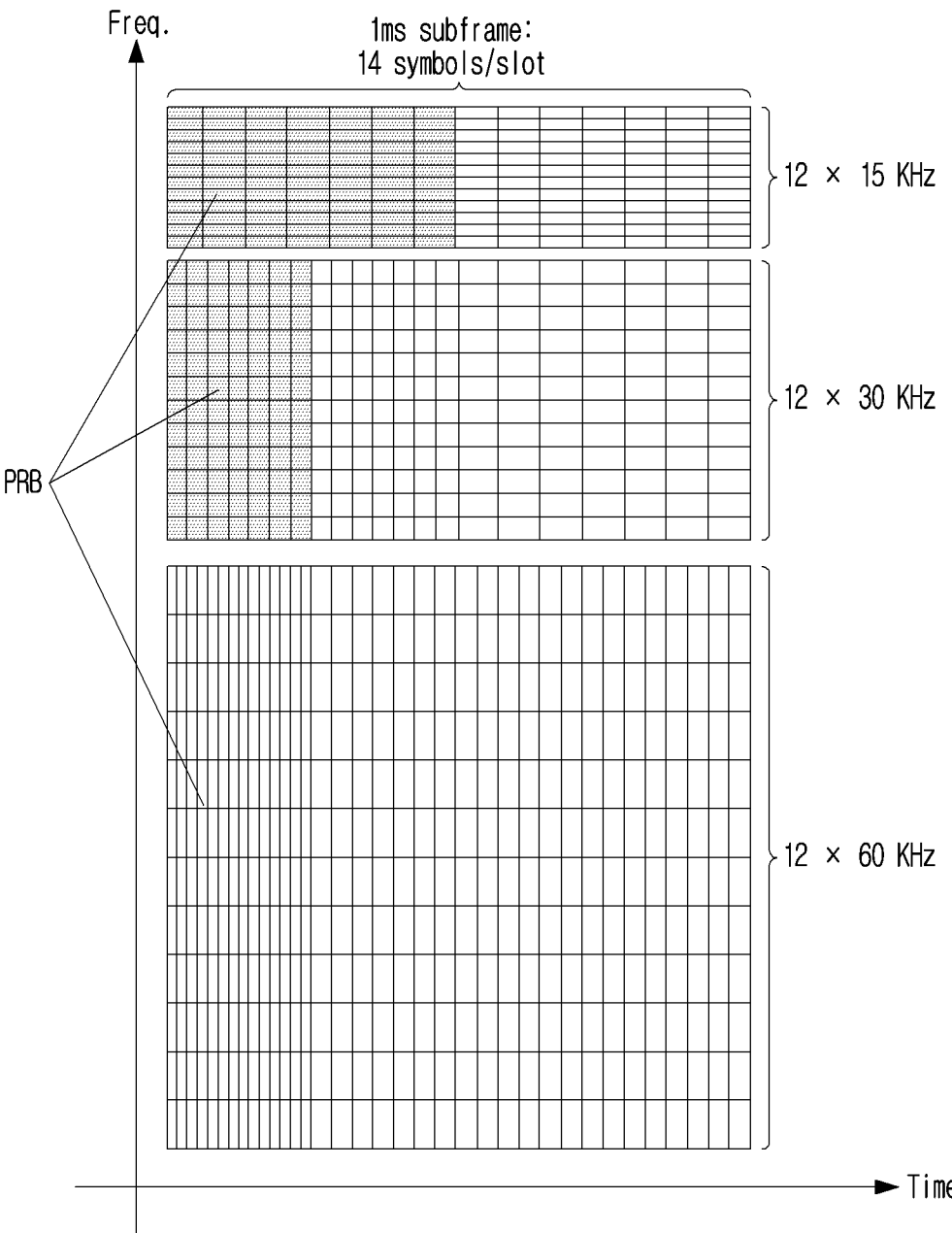
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
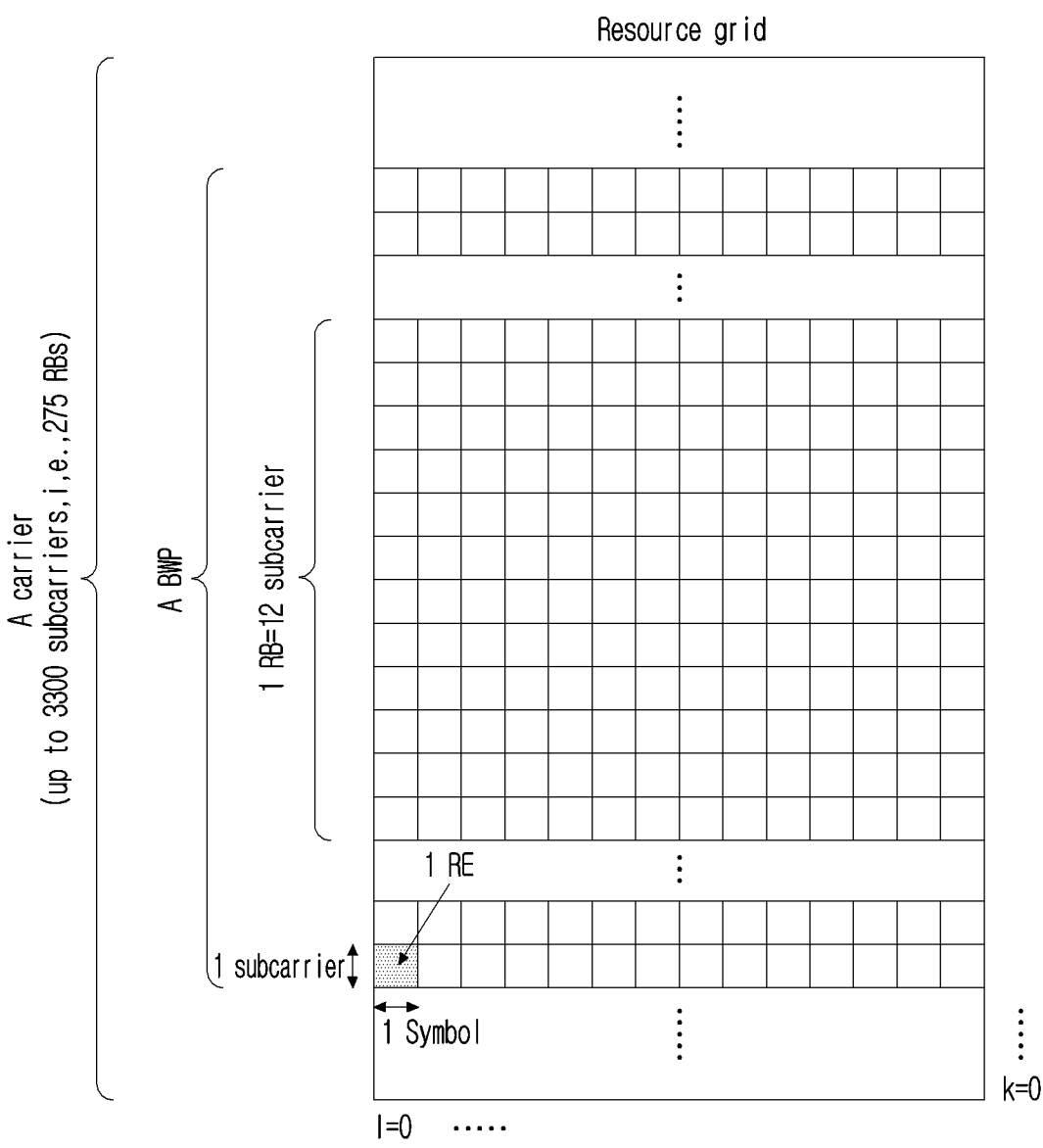
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
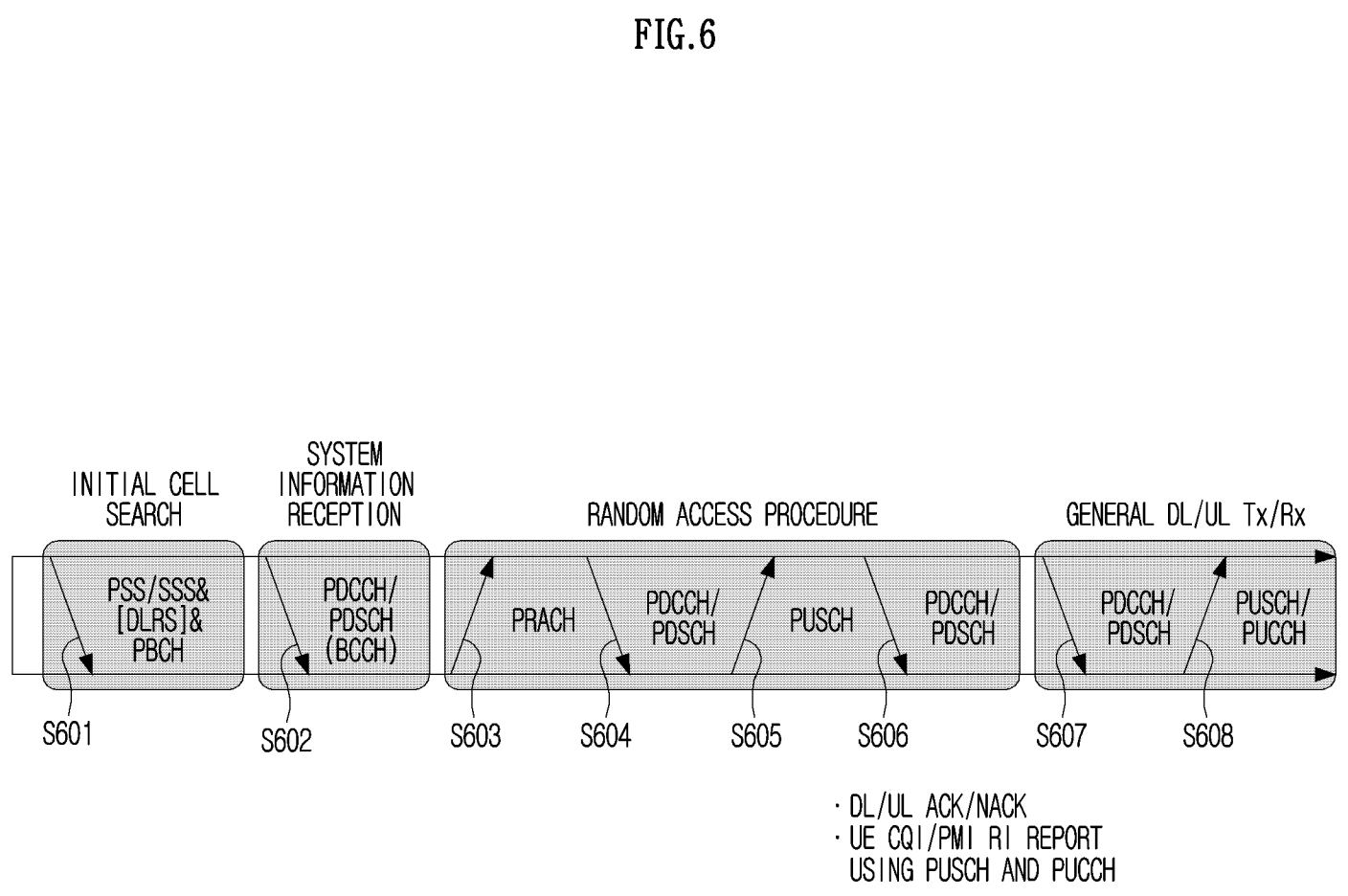

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Wireless Communication System Supporting Non-Terrestrial Network (NTN)

A NTN refers to a segment of a network or a network configured to use a radio resource (RF resource) in an unmanned aircraft system (UAS) platform or a satellite. In order to secure a wider coverage or provide a wireless communication service in a place where it is not easy to install a wireless communication base station, use of a NTN service is considered.

Here, a NTN service refers to providing a wireless communication service to terminals by installing a base station on an artificial satellite (e.g., a geostationary-orbit, low-orbit, medium-orbit satellite, etc.), an airplane, an unmanned airship, a drone, etc., not on the ground. In the following description, a NTN service may include a NR NTN service and/or a LTE NTN service. A terrestrial network (TN) service refers to providing a wireless communication service to terminals by installing a base station on the ground.

A frequency band considered for a NTN service may be mainly a 2 GHz band (S-band: 2-4 GHz) in a first frequency range (frequency range 1, FR1) (e.g., 410 MHz to 7.125 GHz) and a downlink 20 GHz, uplink 30 GHz band (Ka-Band: 26.5~40 GHz)) in a second frequency range (frequency range 2, FR2) (e.g., 24.25 GHz to 52.6 GHz). Additionally, a NTN service may be also supported in a frequency band between 7.125 GHz and 24.25 GHz or in a frequency band equal to or greater than 52.6 GHz.

Figure 7:
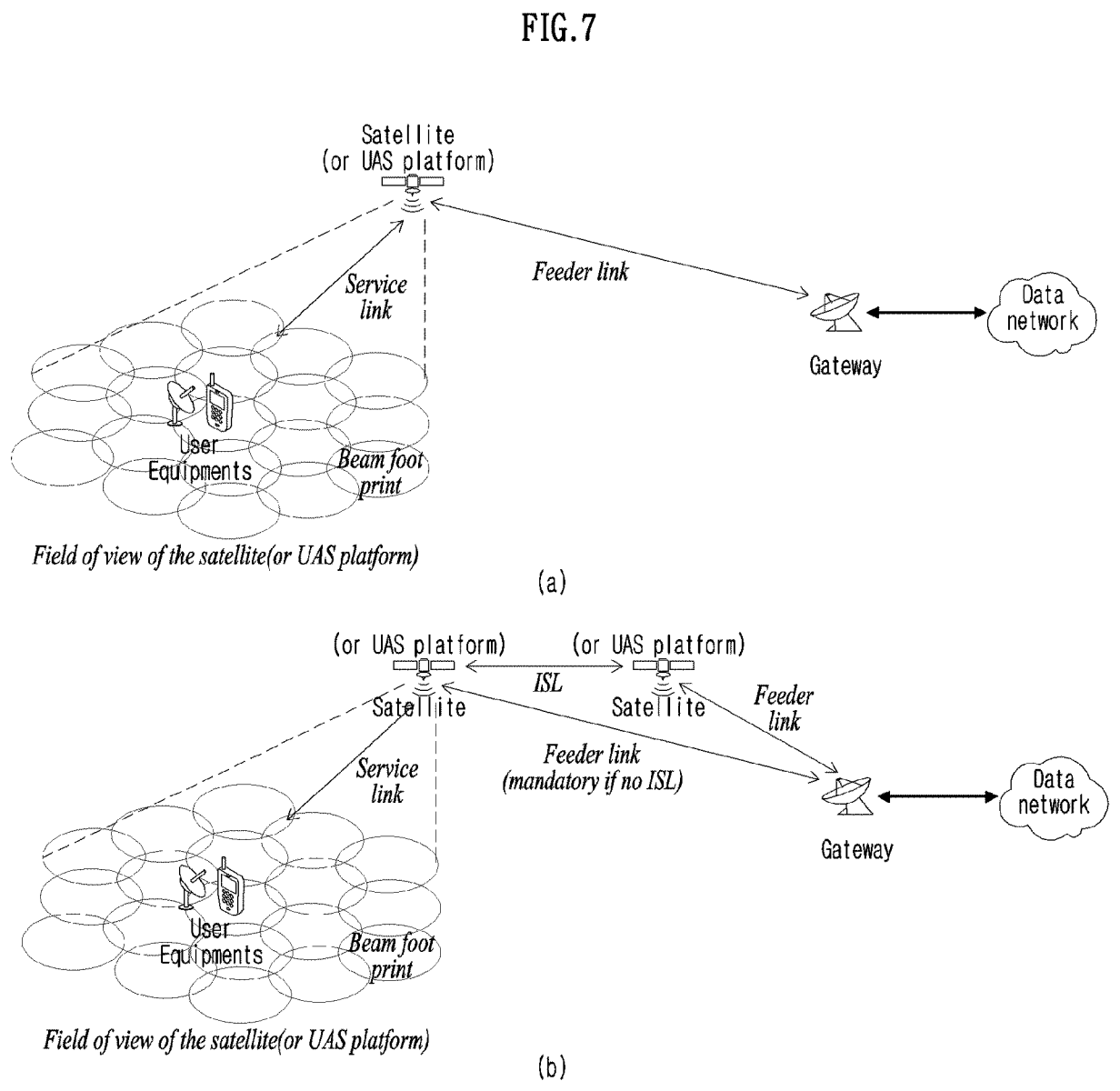

FIG. 7 is a diagram for describing a NTN supported by a wireless communication system to which the present disclosure may be applied.

FIG. 7(a) illustrates a NTN scenario based on a transparent payload and FIG. 7(b) illustrates a NTN scenario based on a regenerative payload.

Here, a NTN scenario based on a transparent payload is a scenario that an artificial satellite receiving a payload from a base station on the ground transmits a corresponding payload to a terminal and a NTN scenario based on a regenerative payload refers to a scenario that an artificial satellite is implemented as a base station (gNB).

A NTN is generally characterized by the following elements.

At least one sat-gateway for connecting a NTN to a common data network:

A geostationary earth orbiting (GEO) satellite is supplied by at least one sat-gateway arranged in a coverage targeted by a satellite (e.g., a regional or continental coverage). It may be assumed that a terminal in a cell is served by only one sat-gateway.

A non-GEO satellite may be successively served by at least one sat-gateway. In this case, a wireless communication system guarantees service and feeder link continuity between serving sat-gateways during a time duration enough to perform mobility anchoring and handover.

Feeder link or radio link between a sat-gateway and a satellite (or a UAS platform)

Service link or radio link between a terminal and a satellite (or a UAS platform)

Satellite (or UAS platform) which may implement one of a transparent or regenerative payload (including on-board processing)

Satellite (or UAS platform) generation beams generally generate a plurality of beams in a service region where a boundary is designated by a view of a satellite (or a UAS platform). A footprint of a beam is generally elliptical. A view of a satellite (or a UAS platform) is determined by an on-board antenna diagram and a minimum altitude angle.

Transparent payload: Radio frequency filtering, frequency conversion and amplification. Accordingly, a waveform signal repeated by a payload is not changed.

Regenerative payload: Demodulation/decoding, switching and/or routing, coding/modulation as well as radio frequency filtering, frequency conversion and amplification. It is substantially the same as having all or part of base station functions (e.g., gNB) in a satellite (or a UAS platform).

For a satellite group, ISL (Inter-satellite links). For it, a regenerative payload is required for a satellite. ISLs may operate in a RF frequency or a broadband.

A terminal is serviced by a satellite (or a UAS platform) in a target service region.

Table 6 illustrates types of a satellite (or a UAS platform).

TABLE 6

| Platform | Altitudinal Range | Orbit | General Beam Footprint Size |
|---|---|---|---|
| Low-earth Orbiting Satellite | 300-1500 km | Circular around the Earth | 100-1000 km |
| Medium-earch Orbiting Satellite | 7000-25000 km | | 100-1000 km |
| Geostationary Earth Orbiting Satellite | 35,786 km | Notional Station which maintains a fixed position at an altitude/azimuth for a given earth point | 200-3500 km |
| UAS Platform (including HAPS) | 8-50 km (20 km for HAPS) | | 5-200 km |
| High Elliptical Orbiting Satellite | 400-50000 km | Elliptical around the Earth | 200-3500 km |

Generally, a GEO satellite and a UAS are used to provide a continental, regional or local service. And, a constellation of LEO (low earth orbiting) and MEO (medium earth orbiting) is used to provide a service in both the northern hemisphere and the southern hemisphere. Alternatively, a corresponding constellation may provide a global coverage including a polar region. Subsequently, a proper orbital inclination, a generated sufficient beam and an inter-satellite link may be required. And, a HEO (Highly Elliptical Orbiting) satellite system may be also considered.

Hereinafter, a wireless communication system in a NTN including the following 6 reference scenarios is described.

Circular orbit and notational station keeping up platform

Highest RTD (Round Trip Delay) constraint

Highest Doppler Constraint

Transparent or regenerative payload

1 ISL Case and 1 Case without a ISL For an inter-satellite link, regenerative payload The following 6 reference scenarios are considered in Table 7 and Table 8.

TABLE 7

| | Transparent Satellite | Regenerative Satellite |
|---|---|---|
| GEO-based Non-terrestrial Access Network | Scenario A | Scenario B |
| LEO-based Non-terrestrial Access Network: Steerable Beams | Scenario C1 | Scenario D1 |
| LEO-based Non-terrestrial Access Network: Corresponding beams move with a satellite. | Scenario C2 | Scenario D2 |

TABLE 8

| Scenario | GEO-based Non-terrestrial Access Network (Scenario A and B) | LEO-based Non-terrestrial Access Network (Scenario C and D) |
|---|---|---|
| Orbit Type | Notional Station which maintains a fixed position at an altitude/azimuth for a given earth point | Circular around the Earth |
| Altitude | 35,786 km | 600 km, 1,200 km |
| Spectrum (Service Link) | In FR1 (e.g., 2 GHZ) In FR2 (e.g., DL 20 GHZ, UL 30 GHz) | |
| Maximum Channel Bandwidth Capability (Service Link) | In FR1, 30 MHz In FR2, 1 GHz | |
| Payload | Scenario A: Transparent (including only a radio frequency function) Scenario B: Regenerative (including all or part of RAN functions) | Scenario C: Transparent (including only a radio frequency function) Scenario D: Regenerative (including all or part of RAN functions) |
| Inter-satellite Link | No | Scenario C: No Scenario D: Yes/No (Both two cases are available) |
| Earth-fixed Beam | Yes | Scenario C1: Yes (Steerable Beams)(Reference 1), Scenario C2: No (Corresponding beams move with a satellite) Scenario D1: Yes (Steerable Beams)(Reference 1), Scenario D2: No (Corresponding beams move with a satellite) |
| Maximum Beam Footprint Size (edge-to-edge) irrelevant to Elevation Angle | 3500 km (Reference 5) | 1000 km |
| Minimum Elevation Angle for both Sat-Gateway and Terminal | 10° for Service Link 10° for Feeder Link | 10° for Service Link 10° for Feeder Link |

TABLE 8-continued

| Scenario | GEO-based Non-terrestrial Access Network (Scenario A and B) | LEO-based Non-terrestrial Access Network (Scenario C and D) |
|---|---|---|
| Maximum Distance between Satellite and Terminal at Minimum Elevation Angle | 40581 km | 1,932 km (Altitude of 600 km) 3,131 km (Altitude of 1,200 km) |
| Maximum Round Trip Delay (only Propagation Delay) | Scenario A: 541.46 ms (Service and Feeder Link) Scenario B: 270.73 ms (only Service Link) | Scenario C: (Transparent Payload: Service and Feeder Link) −25.77 ms (600 km) −41.77 ms (1200 km) Scenario D: (Regenerative Payload: Only Service Link) −12.89 ms (600 km) −20.89 ms (1200 km) |
| Maximum Differential Delay in Cell (Reference 6) | 10.3 ms | For each of 600 km and 1200 km, 3.12 ms and 3.18 ms |
| Maximum Doppler Shift (Earth-fixed Terminal) | 0.93 ppm | 24 ppm (600 km)21 ppm (1200 km) |
| Maximum Doppler Shift Variation (Earth-fixed Terminal) | 0.000 045 ppm/s | 0.27 ppm/s (600 km)0.13 ppm/s (1200 km) |
| Movement of Terminal on the Earth | 1200 km/h (e.g., Aircraft) | 500 km/h (e.g., High-speed Train), Possible 1200 km/h (e.g., Aircraft) |
| Terminal Antenna Type | Omnidirectional Antenna (Linear Polarization), Assumed to be 0 dBi Directional Antenna (Aperture Diameter of up to 60 cm in Circular Polarization) | |
| Terminal Transmission (Tx) Power | Omnidirectional Antenna UE Power Class 3 Directional Antenna of up to 200 mW: Up to 20 W | |
| Terminal Noise Level | Omnidirectional Antenna: 7 dB Directional Antenna: 1.2 dB | |
| Service Link | Link defined in 3GPP | |
| Feeder Link | Radio Interface defined in 3GPP or non-3GPP | Radio Interface defined in 3GPP or non-3GPP |

Reference 1: Each satellite may use a beamforming technology to steer a beam to a fixed point on earth. It is applied for a time corresponding to a visibility time of a satellite. Reference 2: The maximum delay variation in a beam (a terminal fixed on earth (or on the ground)) is calculated based on the minimum elevation angle for both a gateway and a terminal.

Reference 3: The maximum differential delay in a beam is calculated based on a diameter of the maximum beam reception scope at nadir.

Reference 4: Speed of light used for delay calculation is 299792458 m/s.

Reference 5: A size of the maximum beam reception scope of GEO is determined based on a GEO high throughput system technology of a current state by assuming that there is a spot beam at a coverage edge (low altitude).

Reference 6: The maximum differential delay at a cell level is calculated by considering a delay at a beam level for the largest beam size. When a beam size is small or medium, a cell may include at least two beams. But, a cumulative differential delay of all beams in a cell does not exceed the maximum differential delay at a cell level of Table 8.

A NTN-related description in the present disclosure may be applied to a NTN GEO scenario and all NGSO (non-geostationary orbit) scenarios having a circular orbit with an altitude of 600 km or more.

And, the description (a NR frame structure, a NTN, etc.) may be applied in combination of methods which will be described later, and may be supplemented to clarify a technical characteristic of a method described in the present disclosure.

Method of Configuring TA (Timing Advance) Value in NTN

In a TN, a terminal moves in a cell, so although a distance between a base station and a terminal changes, a PRACH preamble transmitted by a terminal may be transmitted to a base station within a time duration of a specific RO (RACH occasion).

And, a TA value for transmitting an uplink signal/channel by a terminal may be configured with an initial TA value and a TA offset value. Here, an initial TA value and a TA offset value may be indicated by a base station as a TA value which may be expressed in a cell coverage scope of a base station.

In another example, when a base station indicates a PDCCH order through DCI, a terminal may transmit a PRACH preamble to a base station. A terminal may transmit an uplink signal/channel to a base station by using a TA value (i.e., an initial TA value) indicated through a response message for a preamble received from a base station (random access response, RAR).

In a NTN, a distance between a satellite and a terminal is changed by movement of a satellite regardless of movement of a terminal. In order to overcome it, a terminal may figure out a position of a terminal through a GNSS (global navigation satellite system) and calculate a UE-specific TA, a round trip delay (RTD) between a terminal and a satellite, through orbit information of a satellite indicated by a base station.

Here, a UE-specific TA, when a PRACH preamble is transmitted at a RO selected by a terminal, may be configured so that a satellite (or a base station (gNB)) may receive a PRACH preamble within a time duration of the RO.

And, when only a UE-specific TA is applied when a PRACH preamble is transmitted at a RO selected by a terminal, the PRACH preamble may be delayed from a reference time of the RO and transmitted to a satellite (or gNB). In this case, an initial TA value indicated by a RAR received from a base station may indicate the delayed value.

Additionally, a common TA may refer to a RTD between a satellite and gNB (or a reference point) on the ground. Here, a reference point may refer to a place where a downlink and uplink frame boundary matches. And, a common TA may be defined as being indicated by a base station to a terminal. If a reference point is in a satellite, a common TA may not be indicated and if a reference point is in gNB on the ground, a common TA may be used to compensate a RTD between a satellite and gNB.

Additionally, in a NTN, a TA value before transmission of message (Msg) 1 (e.g., a PRACH preamble)/Msg A (a PRACH preamble and a PUSCH) may be configured as a UE-specific TA and a common TA (if provided). Here, a UE-specific TA, as described above, may be a RTD between a satellite and a terminal calculated by a terminal itself.

Figure 8:
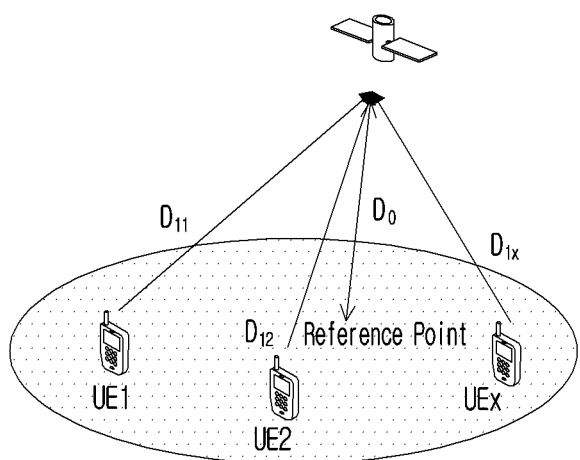
FIG. 8 is a diagram for describing a TA in a NTN supported by a wireless communication system to which the present disclosure may be applied.
Figure 8:
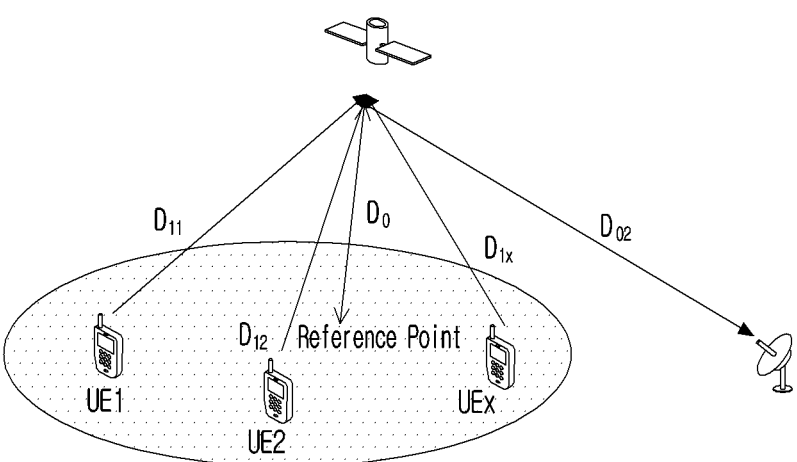

As an embodiment of the present disclosure, FIG. 8 illustrates a method of calculating a TA value in a wireless communication system supporting a NTN.

FIG. 8(a) illustrates a regenerative payload-based NTN scenario. A common TA (Tcom) (common to all terminals) may be calculated by 2D0 (a distance between a satellite and a reference signal)/c and a UE-specific differential TA (TUEx) for a x-th terminal (UEx) may be calculated by $2(D1x-D0)/c$. The Total TA (Tfull) may be calculated by 'Tcom+TUEx'. Here, D1x may refer to a distance between a satellite and UEx. Here, c may represent speed of light.

FIG. 8(*b*) illustrates a transparent payload-based NTN scenario. A common TA (Tcom) (common to all terminals) may be calculated by $2(D01+D02)/c$ and a UE-specific differential TA (TUEx) for a x-th terminal (UEx) may be calculated by $2(D1x-D0)/c$. The Total TA (Tfull) may be calculated by 'Tcom+TUEx'. Here, D01 may refer to a distance between a satellite and a reference point and D02 may refer to a distance between a satellite and a base station on the ground.

Time Reference Applied to NTN Uplink Transmission or Reception

In the present disclosure, examples of a time standard related to uplink transmission of a NTN terminal and uplink reception of a base station are described.

In the present disclosure, a time reference parameter may include a timing advance (TA) parameter. A TA parameter may include a TA command (TAC). Additionally or alternatively, a TA parameter may include at least one of a common TA parameter or a UE-specific TA parameter. Additionally or alternatively, a TA parameter may include at least one of a closed-loop (CL) TA parameter or an open-loop (OL) TA parameter. In other words, unless otherwise limited, a TA parameters in the following description may include at least one of a TAC, a common (or CL) TA parameter or a UE-specific (or OL) TA parameter.

A terminal may calculate a TA based on at least one of a TAC, a common TA parameter (or a CL TA parameter) or a UE-specific TA parameter (or an OL TA parameter). A terminal may determine uplink transmission timing based on a calculated TA.

Figure 9:
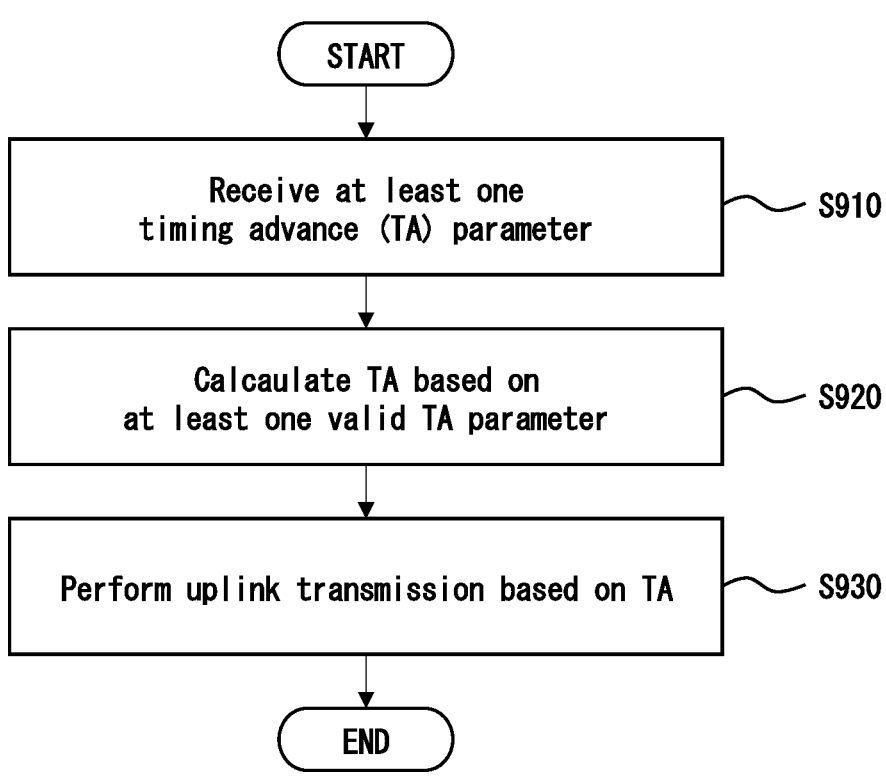
FIG. 9 is a flowchart for describing uplink transmission of a terminal according to an embodiment of the present disclosure.

FIG. 9 is a flowchart for describing uplink transmission of a terminal according to an embodiment of the present disclosure.

In S910, a terminal may receive at least one TA parameter from a base station.

A TA parameter received by a terminal from a base station in S910 may include at least one of a common TA parameter or a CL TA parameter. A terminal may receive a TAC and at least one common (or CL) TA parameter from a base station.

Together with S910 or separately from S910, a terminal may receive at least one of information related to a UE-specific TA parameter or information related to an OL TA parameter from a base station. A terminal may acquire a UE-specific TA parameter and/or an OL TA parameter by itself by using information related to a UE-specific (or OL) TA parameter provided from a base station or even when such information is not provided.

Together with S910 or separately from S910, a terminal may receive configuration information related to a TA control method (e.g., CL and/or OL).

In S920, a terminal may calculate a TA based on at least one valid TA parameter.

A calculated TA may be applied to uplink transmission timing. Applying a TA to uplink transmission timing may include adjusting/updating uplink transmission timing.

A TA parameter applied to adjustment/update of uplink transmission timing may include a TA parameter provided from a base station in S910. Additionally, a time reference parameter applied to uplink transmission timing may further include a TA parameter other than a TA parameter provided from a base station in S910 (e.g., a TA parameter acquired by a terminal itself such as a UE-specific TA parameter, an OL TA parameter, etc.).

A valid TA parameter may be determined according to various detailed examples of the present disclosure for removing or preventing ambiguity of a TA control operation of a terminal.

For example, in S910, a base station may provide at least one common TA parameter to a terminal based on a valid common TA parameter set. In S920, a terminal may expect that a valid set of common TA parameters will be provided from a base station and may ignore or not apply an invalid set. For example, when a TA parameter provided by a base station includes a first common TA parameter and a second common TA parameter, a second common TA parameter may be determined to be valid when (or only when) a first common TA parameter is valid. Here, an order of a first common TA parameter (e.g., a first order) is lower than an order of a second common TA parameter (e.g., a second order). A valid set described above may be similarly applied to at least three common TA parameters (e.g., a first, second and third common TA parameter, . . . ). In other words, on the premise that a common TA parameter of a lower order is valid, it may be determined that a common TA parameter of a higher order is valid. Alternatively, when a common TA parameter of a lower order is invalid, a common TA parameter of a higher order may be determined to be invalid. When a common TA parameter of a lower order is provided, but (at least one) common TA parameter of a higher order is not provided, a terminal may calculate a common TA (or common delay) by applying a default value to (at least one) common TA parameter of a higher order.

As an additional example, an active uplink bandwidth part (BWP) may be changed between a time point when a terminal receives/acquires a TA parameter in S910 (e.g., receives a TA command (TAC), receives a common (or CL) TA parameter and/or acquires a UE-specific (or OL) TA parameter) and a time point when a TA is calculated based on a TA parameter and a calculated TA is applied to uplink transmission timing in S920. In this case, a terminal may determine a time reference parameter (e.g., a TAC, a common (or CL) TA and/or a UE-specific (or OL) TA) based on subcarrier spacing (SCS) of a new active uplink BWP. If an active uplink BWP is changed after a terminal calculates a TA based on a TA parameter in S920 and applies a calculated TA to uplink transmission timing, a terminal may assume that a time reference parameter (e.g., a TAC, a common (or CL) TA and/or a UE-specific (or OL) TA) of the same absolute value is applied before and after a BWP change.

In S930, a terminal may perform uplink transmission based on a calculated TA (or based on uplink transmission timing to which a calculated TA is applied).

Additionally, a terminal may report adjusted/updated time reference information to a base station based on a received/acquired time reference parameter. Alternatively, a terminal may report a TA parameter (e.g., a UE-specific (or OL) TA parameter) determined by a terminal itself to a base station.

Figure 10:
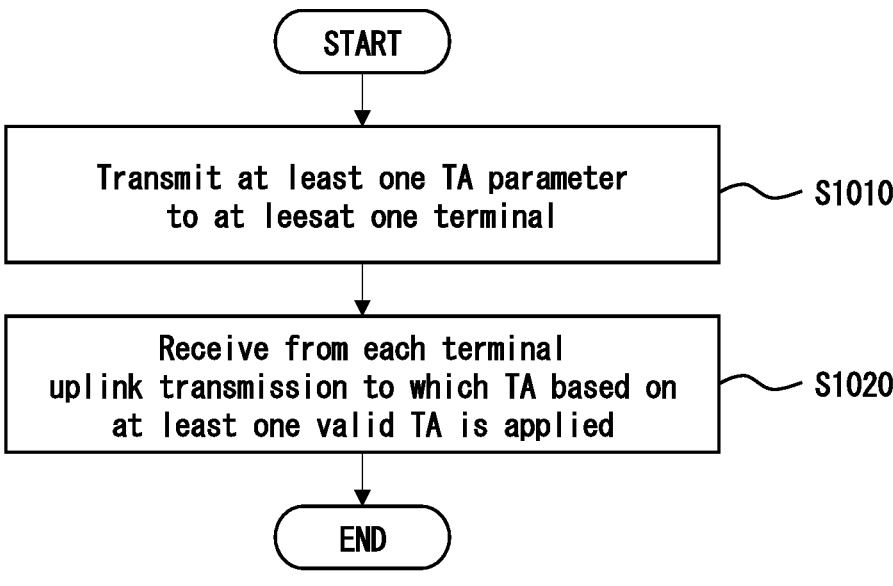
FIG. 10 is a flowchart for describing uplink reception of a base station according to an embodiment of the present disclosure.

FIG. 10 is a flowchart for describing uplink reception of a base station according to an embodiment of the present disclosure.

In S1010, a base station may transmit at least one TA parameter to at least one terminal.

A TA parameter provided by a base station to terminal(s) may include at least common (or CL) TA parameter. Since other detailed examples for S1010 are the same as those for S910 in FIG. 9, an overlapping description is omitted.

In S1020, a base station may receive uplink transmission to which a TA based on at least one valid TA parameter is applied from each of at least one terminal.

When a base station receives uplink transmission from a terminal, it may be based on uplink transmission timing based on a TA parameter provided by a base station to a terminal (e.g., a TAC and/or a common (or CL) TA parameter) and a TA parameter determined by a terminal itself (e.g., a UE-specific (or OL) TA parameter).

In addition, a base station may provide/receive information on a UE-specific (or OL) TA parameter from a terminal and provide/receive information on the entire time reference (e.g., a TA) to which a UE-specific (or OL) TA parameter is applied.

Hereinafter, detailed examples according to the present disclosure are described.

Embodiment 1

A TA control method for a terminal which enters a connected mode (e.g., a RRC Connected mode) may be largely classified into two types. A first type is a closed-loop (CL) TA control method and a second type is an open-loop TA control method. A CL TA control method may include that a base station indicates a timing advance command (TAC) with a MAC-CE, controls a TA by configuring/indicating a drift rate of a common TA considered in a NTN (i.e., a TA covering a RTD between a reference point and a satellite) and others. An OL control method may include that a NTN terminal updates a UE-specific TA (i.e., a TA covering a RTD between UE and a satellite) by itself, controls a TA by configuring/indicating a drift rate of a UE-specific TA and others.

In order to determine uplink transmission timing of a terminal, a CL TA control method and an OL TA control method may be combined and applied. If there is no special restriction, an operation of updating a TA according to a TA parameter indicated through a MAC-CE from a base station and an operation that a terminal updates a UE-specific TA by itself may occur simultaneously. As such, when a CL TA control method and an OL TA control method adjust/update a TA to respond to the same purpose (e.g., a RTT change according to a terminal position), CL TA control and OL TA control may conflict. For example, in the worst case, a situation may occur in which a TA value corrected by a base station with CL TA control is restored by a terminal with OL TA control and it is corrected again by a base station with CL TA control.

To solve this problem, a terminal may be configured/ indicated so that CL TA control and OL TA control respond to a different purpose. For example, CL TA control may be applied only when a RTD between a reference point and a satellite is changed and OL TA control may be applied only when a RTD between a terminal and a satellite is changed. CL TA control may be configured/indicated by a base station to a terminal, and OL TA control may be applied by a terminal itself or a base station may configure/indicate information related to OL TA control.

In order to operate in this way, each of a base station and a terminal may be required to separately track a common TA and a UE-specific TA and it may be configured to perform such separate tracking. In other words, it may be configured to correct a TA by using an OL TA control method only when a UE-specific TA is changed from a terminal's perspective and it may be configured to correct a TA for a terminal by using a CL TA control method only when a common TA is changed from a base station's perspective. As a result, when TA control is configured/indicated for a different purpose, a UE-specific TA may be configured to update only a terminal and a common TA may be configured to update only a base station.

As described above, when CL TA control and OL TA control are configured/indicated to respond to a different purpose, complexity of an operation of a terminal/a base station (e.g., complexity due to addition of a tracking operation to a TA of each attribute) may increase. Accordingly, examples for preventing collision of a TA control method as described above without greatly increasing complexity of an operation even when CL TA control and OL TA control are configured/indicated to respond to the same purpose are described below.

Embodiment 1-1

A time duration that each control method (or control loop) operates may be distinguished/limited so that a CL TA control method and an OL TA control method are not simultaneously performed. Application of a TDM method of such CL and OL TA control may be configured/indicated by a base station to a terminal.

For example, information on a time resource such as a period, a duration, etc. for OL TA control may be configured/indicated to a terminal. Information on such a time resource may be configured/indicated in advance by a base station to a terminal through a SIB or RRC signaling. A terminal may perform only an OL TA control operation on a configured/indicated time resource. For example, CL TA control is not indicated from a base station to a terminal on a configured/indicated time resource and a terminal may expect that CL TA control is not indicated in a corresponding time resource. In other words, although CL TA control is indicated in a corresponding time resource, a terminal may ignore it. In addition, a terminal may be explicitly (or implicitly based on a time duration configuration/indication for OL TA control) configured/indicated to perform CL TA control (or perform only CL TA control) on all/part of the remaining time resources excluding a corresponding time resource.

In another example, information on a time resource such as a period, a duration, etc. for CL TA control may be configured/indicated to a terminal. Information on such a time resource may be configured/indicated in advance by a base station to a terminal through a SIB or RRC signaling. A terminal may perform only a CL TA control operation on a configured/indicated time resource. For example, a terminal may be configured not to perform OL TA control on a configured/indicated time resource. In addition, a terminal may be explicitly (or implicitly based on a time duration configuration/indication for CL TA control) configured/in-dicated to perform CL TA control (or perform only CL TA control) on all/part of the remaining time resources excluding a corresponding time resource.

Embodiment 1-2

A priority for a CL TA control method and an OL TA control method may be configured/indicated for a terminal. For example, a configuration/an indication for a priority among TA control methods may be configured/indicated in advance by a base station to a terminal through a SIB or RRC signaling.

For example, CL TA control may be configured/indicated to have a high priority and OL TA control may be config-ured/indicated to have a low priority. It considers that a terminal in a connected mode should be under the control of a base station. For example, TA control based on a MAC-CE (or for a common TA drift rate) may have a higher priority than UE-specific TA update (or TA control for a UE-specific TA drift rate).

In another example, OL TA control may be configured/indicated to have a high priority and CL TA control may be configured/indicated to have a low priority. It considers that a UE-specific TA is frequently changed due to a satellite movement and a common TA value may configure a position of a reference point not to be largely changed according to implementation of a base station. For example, UE-specific TA update (or TA control for a UE-specific TA drift rate) may have a higher priority than TA control based on a MAC-CE (or for a common TA drift rate).

As described above, when a priority for a TA control method is configured/indicated or when a CL TA control method and an OL TA control method are triggered simultaneously (or on an overlapping time resource) for a terminal, a TA control method with a higher priority may be applied and a TA control method with a lower priority may not be applied or may be ignored.

If a TA control method with a lower priority is ignored, TA update may be performed according to a triggered TA control method at a next time point when a TA control method with a lower priority is triggered. For example, it may be assumed that a TA control method with a higher priority is not triggered at the next time point.

Additionally or alternatively, when a CL TA control method and an OL TA control method are triggered simultaneously (or on an overlapping time resource) for a terminal, a TA control method may be sequentially applied according to a priority. For example, if a CL TA control method has a high priority, CL TA control may be applied first and OL TA control may be applied next. In this case, a terminal may be configured to report an updated TA value (or a difference value of a TA updated compared with a previous TA value) to a base station whenever performing each type of TA control.

Embodiment 1-3

According to a network configuration, which TA control method will be applied may be configured/indicated to a terminal.

For example, when a time resource for OL TA control is not indicated (by a base station through a SIB or RRC signaling), a terminal may be implicitly configured/indicated not to use OL TA control.

In another example, whether to use an OL TA control method (by a base station through a SIB or RRC signaling) may be explicitly configured/indicated to a terminal.

A terminal which is (explicitly or implicitly) configured/indicated by a base station not to use an OL TA control method may perform TA update only in a CL TA control method. In this case, a base station may operate to update to an optimal TA value as much as possible by a CL TA control method in order to prevent malfunction of a terminal, but when a UE-specific TA is greatly different from an actually required value for some reasons, a terminal may perform an initial access (e.g., a random access).

Embodiment 1-4

According to whether a terminal moves, whether an OL TA control method is applied may be configured/indicated.

For example, only when a position of a terminal when an uplink (UL) signal/channel is transmitted most recently and a current position of a terminal (or a current position of a terminal which tries to transmit a UL signal/channel) are changed by at least a predetermined preference value (e.g., a distance which is large enough not to be updated by using a TAC through a MAC-CE), it may be configured/indicated to use an OL TA control method.

In other words, while a position is not changed by a predetermined reference value, a terminal may be configured/indicated to apply only a CL TA control method.

In the above-described examples, a terminal which performs TA update by using a CL TA control method and/or an OL TA control method may be configured/indicated to report an updated TA to a base station.

Additionally or alternatively, a terminal which performs TA update by using a CL TA control method (e.g., when a TAC is transmitted through a MAC-CE) may be configured/indicated to report an updated TA to a base station.

Additionally or alternatively, since reporting the entire TA (i.e., a sum of a common TA and a UE-specific TA) whenever an updated TA is reported requires a large signaling overhead, whether a UE-specific TA, not a TA value itself, is updated may be reported to a base station. For example, whether a UE-specific TA is updated by using an OL TA control method may be reported from a terminal to a base station.

In this case, a base station may be configured to estimate an updated (UE-specific) TA value based on a (UE-specific) drift rate and initial (UE-specific) TA information (e.g., a Msg 1 PRACH and/or a Msg 3 PUSCH and/or a Msg.A PRACH/PUSCH) reported at an initial access of a terminal.

In the above-described examples, a target TA value adjusted/updated by a CL TA control method and/or an OL TA control method may be at least one of a UE-specific TA, a common TA or the entire TA (i.e., a sum of a common TA and a UE-specific TA). In the above-described examples, it was described by assuming that an adjusted/updated target TA value is the entire TA, but a scope of the present disclosure is not limited thereto. For example, when a target TA value adjusted/updated in the above-described examples is a UE-specific TA, it may be assumed that a common TA is processed or reflected by a base station (without a separate configuration/indication for a terminal). If a target TA value adjusted/updated in the above-described examples is a common TA, a UE-specific TA may be configured to be updated by a terminal (without separate report to a base station).

In the above-described examples, a common TA and/or a TA command (TAC) (e.g., a TA value indicated through a TAC field such as Msg 2 (RAR) in a random access process), etc. may be configured to perform TA update by a CL method according to a configuration/an indication of a base station. When a base station configures/indicates a terminal to use such a CL TA control method, a terminal may be configured not to performs TA update through OL TA control (e.g., UE-specific TA update) during a pre-promised time (or a time configured/indicated by a base station).

Additionally or alternatively, a terminal may be configured not to perform TA update through OL TA control (e.g., UE-specific TA update) on a specific time resource. For example, the specific time resource may be while CL TA control is performed and/or from a time when it is configured/indicated to operate CL TA control to a time when it is confirmed that CL TA control is ended, or from a time when it is configured/indicated to update a TA to a time when a UL signal/channel is transmitted by using an updated TA. In other words, a terminal may be configured not to expect to update a TA (e.g., a UE-specific TA) through OL TA control on the above-described time resource.

For example, when a terminal is indicated to update a TA through a TA command field of a MAC-CE, it may be configured not to update a UE-specific TA on the above-described specific time resource (or from a time when a MAC-CE TA command giving a configuration/an indication to update a TA is received through a PDCCH/a PDSCH to a time when a UL signal/channel is transmitted by using an updated TA).

In another example, when a terminal is indicated to update a TA through a TA command field of a Msg.2 RAR, it may be configured not to update a UE-specific TA on the above-described specific time resource (or from a time when receiving a PDCCH scheduling a Msg.2 RAR (or a PDSCH including a RAR) to a time when transmitting a Msg.3 or Msg A PUSCH (including initial transmission and retransmission).

In another example, when a terminal receives a new indication about a common TA and/or a common TA drift rate, etc. through higher layer signaling (e.g., a SIB or RRC signaling), it may be configured not to update a UE-specific TA on the above-described specific time resource (or a time when receiving a PDCCH scheduling a SIB or RRC signaling (or a PDSCH including a SIB or RRC signaling) to a time when transmitting a UL signal/channel).

Meanwhile, in a NTN, a TA may be calculated as follows.

$$T_{TA} = (N_{TA} + N_{TA,UE\text{-}specific} + N_{TA,common} + N_{TA,offset}) \times T_c$$

Here, $N_{TA}$ and $N_{TA,offset}$ are the same as the existing TA parameter. Specifically, $N_{TA}$ is a parameter determined according to a TAC provided through a RAR or a MAC CE. A TAC indicates a predefined difference value (or step size), and a $N_{TA}$ may be calculated by accumulating a value indicated by a TAC. $N_{TA,offset}$ corresponds to a TA offset value generated by a duplex mode difference, etc. For example, $N_{TA,offset}$ is 0 in FDD, and in TDD, it may be defined as a predetermined default value in consideration of a margin for a DL-UL switching time. For example, a default value of $N_{TA,offset}$ may be given as a different value according to a frequency scope.

As $N_{TA,UE\text{-}specific}$ and $N_{TA,common}$ are a parameter which is newly introduced in a NTN, they correspond to a UE-specific TA parameter and a common TA parameter, respectively.

Here, $N_{TA}$ and $N_{TA,common}$ may be indicated to be updated through the same signaling or may be indicated to be updated through different signaling.

When $N_{TA}$ and $N_{TA,common}$ are indicated to be updated through different signaling, a terminal may perform the following operation.

First, a terminal may be configured to update each TA value whenever different signaling indicating update of two TAs (i.e., $N_{TA}$ and $N_{TA,common}$) is provided. If update signaling for two TAs is provided at a time when a terminal tries to update a TA, it may be configured to acquire a final TA by updating each of two TAs. Alternatively, when update signaling for one TA of two TAs is provided at a time when a terminal tries to update a TA, one signaled TA may be updated and applied and the other TA may be configured to use the latest updated or accumulated TA value used when transmitting a previous UL signal/channel. Alternatively, when update signaling is not provided for either of two TAs at a time when a terminal tries to update a TA, both TAs may be configured to use the latest updated or accumulated value used when transmitting a previous UL signal/channel.

Second, when at least one of different signaling indicating update of two TAs (i.e., $N_{TA}$ and $N_{TA,common}$) is provided, a terminal may be configured to update the remaining TAs to the latest TA value. For example, when a base station gives an indication to update $N_{TA}$ through a TA command field of a RAR and/or a MAC-CE, a terminal may be configured to update $N_{TA}$ according to an indicated value, and at the same time, update $N_{TA,common}$ based on pre-acquired information (or use the latest $N_{TA,common}$ value or to use a $N_{TA,common}$ value which exists within a valid window (or a valid timer)). Alternatively, when there is no value which is previously used/configured/indicated for $N_{TA,common}$ from a viewpoint of a terminal, it may be configured to use a default value (e.g., 0 or the maximum TA value based on a feeder link delay).

When $N_{TA}$ and $N_{TA,common}$ are indicated to be updated through the same signaling, a terminal may perform the following operation.

For example, it may be assumed that $N_{TA}$ and $N_{TA,common}$ are updated through a MAC-CE. Characteristically, both parameters (i.e., $N_{TA}$ and $N_{TA,common}$) are updated and signaled through a MAC-CE, but they may be configured/indicated to be updated by using a different period. For example, $N_{TA}$ may be configured/indicated to be updated at a relatively short period and $N_{TA,common}$ may be configured/indicated to be updated at a relatively long period. Here, a parameter updated at a relatively long period may be indicated by adding a 1-bit field (e.g., an indicator field) to the MAC-CE. For example, when the 1-bit indicator field has a value of 0 (or 1), $N_{TA}$ may be indicated and when the 1-bit indicator field has a value of 1 (or 0), $N_{TA,common}$ may be indicated. When the 1-bit indicator field indicates $N_{TA,common}$, a step size which may be indicated through a TA command field may be configured to be different (e.g., larger) from a step size which may be indicated for $N_{TA}$. Such a different step size may be configured/indicated through a predefined new table or a predefined new step size.

Additionally or alternatively, $N_{TA,common}$ may be configured to indicate a cumulative value to reduce signaling overhead. In addition, when a base station indicates update for $N_{TA,common}$, a terminal may inform a base station of whether to receive (i.e., ACK). In other words, when a terminal successfully receives an update indication for $N_{TA,common}$, it may transmit ACK to a base station.

Hereinafter, an operation of a terminal for BWP change generation and TA application is described.

For a terminal other than a NTN terminal, if a terminal changes an active uplink (UL) BWP between a time of receiving a TAC and a time of applying adjustment corresponding to uplink transmission timing (i.e., indicated by a TAC), a terminal may determine a TAC value based on subcarrier spacing (SCS) of a new active UL BWP. If a terminal changes an active UL BWP after applying adjustment to uplink transmission timing, a terminal may assume a TAC value of the same absolute value before and after an active UL BWP change.

Since it is an operation considering only a TAC field, it may not be applied as it is to a TA update operation of a terminal in a NTN. In other words, since a common TA parameter (i.e., $N_{TA,common}$) and a UE-specific TA parameter (i.e., $N_{TA,UE\text{-}specific}$) should be considered in a NTN, a TA operation in a BWP change also needs to be newly defined by additionally considering a parameter as above.

For a NTN terminal, if a terminal changes an active UL BWP between a time of receiving/acquiring a TA parameter and a time of applying adjustment corresponding to uplink transmission timing (i.e., based on a received/acquired TA parameter), a terminal may determine a TA parameter value based on SCS of a new active UL BWP. If a terminal changes an active UL BWP after applying adjustment to uplink transmission timing, a terminal may assume a TA parameter value of the same absolute value before and after an active UL BWP change.

More specifically, for a NTN terminal, if a terminal changes an active UL BWP between a time of receiving/acquiring a TA parameter (e.g., at least one of TAC reception, $N_{TA,common}$ reception or $N_{TA,UE-specific}$ acquisition) and a time of applying adjustment corresponding to uplink transmission timing (i.e., based on a received/acquired TA parameter), a terminal may determine a value of a TA parameter (e.g., at least one of a TAC, $N_{TA,common}$, or $N_{TA,UE-specific}$) based on SCS of a new active UL BWP. If a terminal changes an active UL BWP after applying adjustment to uplink transmission timing, a terminal may assume/apply a value of a TA parameter (e.g., at least one of a TAC, $N_{TA,common}$, or $N_{TA,UE-specific}$) of the same absolute value before and after an active UL BWP change.

Accordingly, ambiguity for TA control/update may be removed when a BWP is changed for a NTN terminal.

Embodiment 2

This embodiment relates to a time unit configuration between TA control methods.

When a terminal updates a UE-specific TA and reports it to a base station, a corresponding UE-specific TA value may be configured in a unit of a time sample or $T_c$. In this case, when it is assumed a MAC-CE TAC is used for a CL TA control method and a UE-specific TA update method is used for an OL TA control method, a TA may be calculated as follows.

$$T_{TA}=(N_{TA}+N_{TA,offset}+N_{TA,UE-specific}+[N_{TA,common}])\times T_c+[N_{TA,common}]$$

Here, $N_{TA}$ may be updated through a TAC of a MAC-CE as follows.

$$N_{TA,new}=N_{TA,old}+(T_A-31)\times16\times64/2^\mu$$

Here, corresponds to a subcarrier spacing (SCS) configuration index and $\mu$=0, 1, 2, 3, 4, 5, 6, . . . may correspond to SCS=15, 30, 60, 120, 240, 480, 960 kHz, . . . , respectively.

In addition, a UE-specific TA may be divided into two cases as follows according to a reporting/calculating unit.

First, when a reporting/calculating unit is a time sample unit, a UE-specific TA may be configured as follows.

$$N_{TA,UE-specific\_new}=N_{TA,UE-specific\_old}\times16\times64/2^\mu$$

Here, by considering signaling overhead of a terminal, 16×64 in the formula may be modified to a larger number as configured/predefined (e.g., predefined in a standard without signaling between a base station and a terminal) by a base station.

Second, when a reporting/calculating unit is $T_c$, a UE-specific TA may be configured as follows.

$$N_{TA,UE-specific\_new}=N_{TA,UE-specific\_old}$$

When a terminal reports a UE-specific TA updated as above to a base station, it may be configured to report an absolute value of an updated UE-specific TA as it is, but it may be also configured to report only a differential value between the latest reported UE-specific TA value and an updated UE-specific TA. It may help reduce signaling overhead of a terminal.

Hereinafter, a common TA time unit configuration is described.

A time unit of a common TA indicated by a base station may be configured to be the same $16\times64/2^\mu$ as the existing $N_{TA}$. When it is considered that a common TA needs to be configured/indicated to be cell-specific (i.e., UE-common) unlike the existing $N_{TA}$, a time unit considering a SCS value may be interpreted as a different value per terminal (i.e., since SCS may be configured differently per terminal). Examples of the present disclosure for solving this problem are described.

Embodiment 2-1

A base station may indicate reference SCS to be applied to a common TA to terminal(s).

For example, a base station may indicate a reference SCS value to be applied to a common TA together with a DL signal/channel (e.g., a SIB or RRC signaling) that a common TA, a common TA drift rate, etc. is indicated.

If a base station does not indicate a reference SCS, a terminal may be configured to use a default SCS value.

In this case, a default SCS value may be predefined without signaling between a base station and a terminal or may be defined as the smallest SCS value or the largest SCS value, etc. which may be used in a corresponding frequency scope.

Embodiment 2-2

Reference SCS to be applied to a common TA may be predefined. In other words, reference SCS or a rule for deriving reference SCS may be predefined without signaling between a base station and a terminal.

For example, reference SCS may be defined as the smallest SCS value or the largest SCS value, etc. which may be used in a corresponding frequency scope.

For example, reference SCS may be configured to follow a SCS value used for an initial BWP of a corresponding cell.

For example, it may be defined to apply a SCS value used for transmission of a specific DL signal/channel (e.g., a SSB, a PDCCH, a PDSCH, etc.) as reference SCS (in an initial access step).

For example, it may be defined to apply a SCS value used for transmission of a specific UL signal/channel (e.g., a PRACH preamble, a Msg.3 PUSCH, a Msg B PUSCH, a PUCCH, etc.) as reference SCS (in an initial access step).

Embodiment 3

This embodiment relates to a parameter for an accurate common TA indication.

A base station may indicate a common TA to a terminal to compensate a RTD from a reference point to a satellite. In this case, additional parameter(s) other than a common TA value (or it be expressed as a common delay) may be indicated so that a terminal can accurately predict a common TA value. For example, an additional parameter may include a common TA drift rate, a common delay drift second order derivative, a common delay drift third order derivative, etc.

A base station may deliver a common TA and the additional parameter(s) (hereinafter, collectively referred to as a common TA parameter) to a terminal through a SIB or RRC signaling, etc. In this case, a transmission period may be independently configured for each parameter (i.e., a period may be the same or different).

For example, a transmission period may be configured to increase in order of a common TA, a common TA drift rate, a common delay drift second order derivative, a common delay drift third order derivative, . . . In other words, a transmission period of a common TA parameter with a relatively low order may be relatively short and a transmission period of a common TA parameter with a relatively high order may be relatively long.

In another example, a transmission period of a common TA parameter with a relatively low order may be relatively long and a transmission period of a common TA parameter with a relatively high order may be relatively short. For example, it may be configured that a common TA is the longest period (e.g., X), a common TA drift rate is N times a common TA transmission period (or a period is 2X), a common TA drift rate second order derivative is 2N times a common TA drift rate transmission period (or a period is 3X), a common delay drift third order derivative is 3N (or 4N) times a common TA drift rate second order derivative (or a period is 4X).

Additionally, a transmission period of some common TA parameters of a different order may be configured to be the same. For example, a transmission period of some common TA parameters of a consecutive order may be configured to be the same. For example, it may be configured such as a transmission period of a common TA>a transmission period of a common TA drift rate=a transmission period of a common TA drift rate second order.

In another example, it may be considered to group and transmit the respective parameters in different numbers of series/groups while configuring a transmission period of common TA parameters equally. For example, a relatively large number of common TA parameters with a relatively low order may be transmitted in bundles (or in series) at once and a relatively small number of common TA parameters with a relatively high order may be transmitted in bundles (or in series) at once. For example, a method may be considered that a common TA is indicated by Y series, a common TA drift rate is indicated by floor(Y/2) series, a common delay drift second order derivative is indicated by floor(Y/3) series and a common delay drift third order derivative is indicated by floor(Y/4) series according to a time change. Here, floor(X) means the largest integer which does not exceed X. Alternatively, a method of transmitting only one specific parameter and transmitting the remaining parameters in a plurality of series may be also considered.

Considering this method, there is an advantage that a terminal does not need to decode a common TA parameter frequently.

Hereinafter, a set of common TA parameters is described. A set may include one element or may include a plurality of elements.

A valid (or permitted) set for configuring/indicating common TA parameters (e.g., a common TA, a common TA drift rate, a common TA drift rate variation, a common TA third order derivative, . . . ) may be defined. Examples of a valid set are the same as V1, V2, V3, V4, . . . below. In addition, in a terminal operation described below, when a terminal does not expect, it may mean that a terminal may determine it as an error case and ignore it.

A terminal may expect that a common TA parameter of a valid set will be provided from a base station. In other words, a terminal may not apply or may ignore a common TA parameter of an invalid set.

V1={Common TA}

V2={Common TA, Common TA drift rate}

V3={Common TA, Common TA drift rate, Common TA drift rate variation}

V4={Common TA, Common TA drift rate, Common TA drift rate variation, Common TA third order derivative}

Among examples of a common TA parameter, a common TA corresponds to a parameter of the lowest order, and in order of a common TA drift rate, a common TA drift rate variation, a common TA third order derivative, . . . , it corresponds to a parameter of a higher order.

For example, among common TA parameters which may be configured/indicated, a terminal may not expect that common TA parameter(s) of a relatively high order are configured/indicated without a common TA parameter of a relatively low order. In other words, when a common TA drift rate (and a parameter of a higher order) is configured/indicated without a common TA, a terminal may not expect or determine it as an error case. In addition, when a common TA drift rate variation (and a parameter of a higher order) is configured/indicated without a common TA and/or a common TA drift rate, a terminal may not expect or determine it as an error case. In addition, when a common TA third order derivative (and a parameter of a higher order) is configured/indicated without at least one of a common TA, a common TA drift rate or a common TA drift rate variation, a terminal may not expect or determine it as an error case.

For example, it is assumed that a set of common TA parameters includes a first common TA parameter (e.g., a common TA (or a common delay)), a second common TA parameter (e.g., a common TA drift (or a common delay drift)) and a third common TA parameter (e.g., a common TA drift variation (or a common delay drift variation)). It is assumed that an order of a first common TA parameter is lower than that of a second common TA parameter and an order of a second common TA parameter is lower than that of a third common TA parameter.

In this case, on the assumption that a first common TA parameter is valid, it may be determined that a second common TA parameter is valid. On the assumption that a (first and) second common TA parameter is valid, it may be determined that a third common TA parameter is valid.

In addition, when a first common TA parameter is invalid, it may be determined that a second common TA parameter is invalid. When a (first and/or) second common TA parameter is invalid, it may be determined that a third common TA parameter is invalid.

For example, when a first common TA parameter is provided, but a second (and third) common TA parameter is not provided, a terminal may apply a default value to a second (and third) common TA parameter to calculate a common TA (or common delay) value. When a first and second common TA parameters are provided, but a third common TA parameter is not provided, a terminal may apply a default value to a third common TA parameter to calculate a common TA (or common delay) value.

More specifically, examples of an invalid set of common TA parameters configured/indicated from a base station may be referred to as I1, I2, . . . , I12. In other words, a terminal may not expect that a common TA parameter of an invalid set is configured/indicated from a base station.

I1=empty set (i.e. no common TA parameter is not configured/indicated)

I2={common TA drift rate}

I3={common TA drift rate variation}

I4={common TA third order derivative}

I5={common TA, common TA drift rate variation}

I6={common TA, common TA third order derivative}

I7={common TA drift rate, common TA drift rate variation}

I8={common TA drift rate, common TA third order derivative}

I9={common TA drift rate variation, common TA third order derivative}

I10={common TA, common TA drift rate, common TA third order derivative}

I11={common TA, common TA drift rate variation, common TA third order derivative}

I12={common TA drift rate, common TA drift rate variation, common TA third order derivative}

In the above-described examples, it is assumed that each common TA parameter is configured/indicated as a non-zero value. In other words, when a common TA parameter is configured/indicated as a non-zero value, a terminal may expect that it is configured/indicated as a set of V1 to V4 and a terminal may not expect that it is configured/indicated as a set of I1 to I12. This example is based on an assumption that it may be valid when a common TA parameter has a non-zero value (separately from validity of a set of common TA parameters).

In another example, it may be assumed that a case in which a value of a common TA parameter is 0 may be also valid (separately from validity of a set of common TA parameters) like a non-zero value. In other words, a value of each common TA parameter may be configured/indicated as 0 or a non-zero value. In this case, a terminal may not expect the above-described invalid (or unpermitted) set I1 to I12. In addition, a terminal may not expect specific examples (e.g., V2_1, V31, V3_2, V33, V3_4, V4_1, V4_2, V4_3, V4_4, V4_5, V4_6, V4_7, V4_8, V4_9, V4_10, V4_11) among detailed examples of the above-described valid (or permitted) set V1 to V4.

For example, a terminal may not expect that a value of a common TA parameter of a relatively low order is configured/indicated as 0 and a value of a common TA parameter of a relatively high order is configured/indicated as a non-zero value. Alternatively, (only) when a value of a common TA parameter of a relatively low order is non-zero, a value of a common TA parameter of a relatively high order may have a non-zero value.

V1={common TA}

V2={common TA, common TA drift rate}

V2_1={common TA=0, common TA drift rate≠0}

V3={common TA, common TA drift rate, common TA drift rate variation}

V31={common TA=0, common TA drift rate≠0, common TA drift rate variation≠0}

V3_2={common TA≠0, common TA drift rate=0, common TA drift rate variation≠0}

V33={common TA=0, common TA drift rate=0, common TA drift rate variation≠0}

V3_4={common TA=0, common TA drift rate≠0, common TA drift rate variation=0}

V4={common TA, common TA drift rate, common TA drift rate variation, common TA third order derivative}

V4_1={common TA=0, common TA drift rate≠0, common TA drift rate variation≠0, common TA third order derivative≠0}

V4_2={common TA≠0, common TA drift rate=0, common TA drift rate variation≠0, common TA third order derivative≠0}

V4_3={common TA≠0, common TA drift rate≠0, common TA drift rate variation=0, common TA third order derivative≠0}

V4_4={common TA=0, common TA drift rate=0, common TA drift rate variation≠0, common TA third order derivative≠0}

V4_5={common TA=0, common TA drift rate≠0, common TA drift rate variation=0, common TA third order derivative≠0}

V4_6={common TA=0, common TA drift rate≠0, common TA drift rate variation≠0, common TA third order derivative=0}

V47={common TA≠0, common TA drift rate=0, common TA drift rate variation=0, common TA third order derivative≠0}

V4_8={common TA≠0, common TA drift rate=0, common TA drift rate variation≠0, common TA third order derivative=0}

V4_9={common TA=0, common TA drift rate=0, common TA drift rate variation=0, common TA third order derivative≠0}

V4_10={common TA=0, common TA drift rate=0, common TA drift rate variation≠0, common TA third order derivative=0}

V4_11={common TA=0, common TA drift rate≠0, common TA drift rate variation=0, common TA third order derivative=0}

Valid set(s) and/or invalid set(s) of the above-described common TA parameter may be configured/indicated by a base station or may be predefined without signaling between a base station and a terminal. A base station may select one set among predefined or pre-configured/indicated valid set(s) to provide a value of common TA parameter(s) belonging to a corresponding set to a terminal. A terminal may expect that a common TA parameter will be provided as one set among predefined or pre-configured/indicated valid set(s).

As an additional example, a method of interpreting a common TA parameter differently according to a UE capability may be applied. A UE capability related to a common TA parameter may be configured according to the number of common TA parameters which may be used as much as possible to track a common TA. For example, for a terminal which uses/supports only 1 common TA parameter of a common TA, it may be configured as UE capa-1. For a terminal which uses/supports up to 2 common TA parameters of a common TA and/or a common TA drift rate, it may be configured as UE capa-2. For a terminal which uses/supports up to 3 common TA parameters of at least one of a common TA, a common TA drift rate or a common TA drift rate variation, it may be configured as UE capa-3. For a terminal which uses/supports up to 4 common TA parameters of at least one of a common TA, a common TA drift rate, a common TA drift rate variation or a common TA third order derivative, it may be configured as UE capa-4.

A terminal may report its capability information to a base station, and a base station may optionally indicate proper common TA parameters (or common TA parameter set) by considering a capability reported by terminals.

A base station may determine, based on a reported UE capability, the maximum number of common TA parameters included in a set to be configured/indicated to a corresponding terminal, and a terminal may not expect, based on its capability, that a set including a number exceeding the maximum number of common TA parameters is configured/indicated.

When a set including common TA parameter(s) exceeding the maximum number of parameters corresponding to a capability reported by a specific terminal is configured/indicated from a base station, a corresponding terminal may determine that a corresponding set itself is invalid and ignore it. Alternatively, a terminal may determine that only the number of parameters it may use/support (e.g., in order from a parameter of a low order) among corresponding sets is valid and apply it, and it may ignore the remaining parameter(s) or apply a default value (e.g., 0) regardless of a value configured/indicated by a base station.

For example, it is assumed that a terminal reports UE capa-1 to a base station and a base station signals a set of {common TA, common TA drift rate} to a corresponding terminal. In this case, a terminal may ignore a common TA drift rate parameter or assume it as a default value (e.g., 0) to calculate a common TA.

When a set including common TA parameter(s) less than the maximum number of parameters corresponding to a capability reported by a specific terminal is configured/indicated from a base station, a corresponding terminal may apply a default value (e.g., 0) to common TA parameter(s) which are not provided from a base station.

For example, it is assumed that a terminal reports UE capa-3 to a base station and a base station signals a set of {common TA, common TA drift rate} to a corresponding terminal. In this case, a terminal may calculate a common TA by assuming that a common TA drift rate variation parameter is a default value (e.g., 0).

As an additional example, a base station may configure/indicate a common TA parameter according to the highest capability which may be satisfied by all terminals based on a capability reported by a plurality of terminals. This capability report may be configured per terminal (per UE) or per feature set (per FS).

When carrier aggregation supporting a plurality of cells is applied to a NTN, for a flexible configuration of a base station, a UE capability may be configured/indicated per band or per band combination or per BWP.

In the above-described examples, an example of a default value for a common TA parameter was described as 0, but other non-zero value may be used as a default value. Alternatively, a base station may configure/indicate in advance a default value for a common TA parameter to a terminal.

Figure 11:
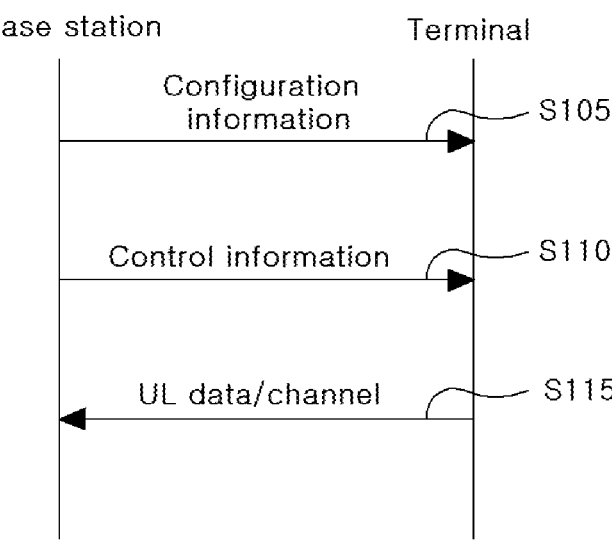
FIG. 11 is a diagram for illustrating a signaling process according to an embodiment of the present disclosure.

FIG. 11 is a diagram for describing a signaling process according to an embodiment of the present disclosure.

FIG. 11 represents an example of signaling between a network side (or a base station) and a terminal (UE) in a situation when at least one physical channel/signal to which the above-described examples of the present disclosure (e.g., Embodiment 1, 2, 3, and a combination of at least one of examples described in detailed embodiments thereof) may be applied is NTN-transmitted.

Figure 12:
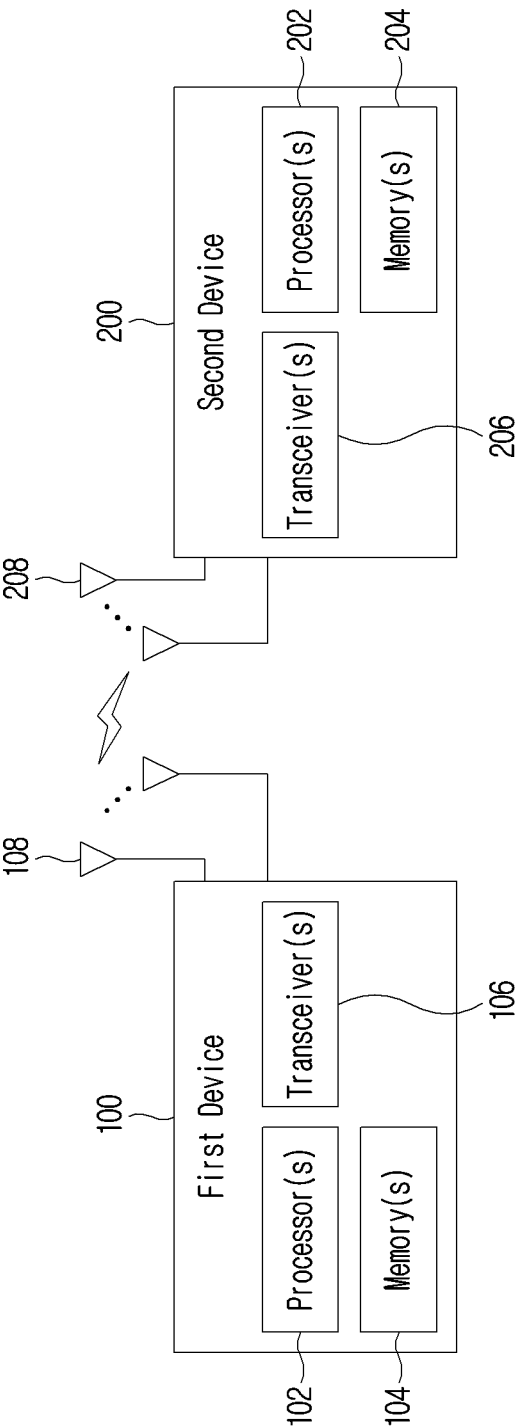
FIG. 12 is a diagram which illustrates a block diagram of a wireless communication device according to an embodiment of the present disclosure.

Here, UE/a network side is illustrative and may be applied by being replaced with a variety of devices as described by referring to FIG. 12. FIG. 11 is for convenience of a description, and it does not limit a scope of the present disclosure. In addition, some step(s) shown in FIG. 11 may be omitted depending on a situation and/or a configuration, etc. In addition, in an operation of a network side/UE in FIG. 11, the above-described uplink transmission or reception operation, etc. may be referred to or used.

In the following description, a network side may be one base station including a plurality of TRPs or may be one cell including a plurality of TRPs. Alternatively, a network side may include a plurality of remote radio heads (RRH)/remote radio units (RRU). In an example, an ideal/non-ideal backhaul may be configured between TRP 1 and TRP 2 configuring a network side. In addition, although the following description is described based on multiple TRPs, it may be extended and applied equally to transmission through multiple panels/cells, and it may be also extended and applied to transmission through multiple RRHs/RRUs.

In addition, in the following description, it is described based on a "TRP", but as described above, "TRP" may be applied by being replaced with an expression such as a panel, an antenna array, a cell (e.g., a macro cell/a small cell/a picocell, etc.), a transmission point (TP), a base station (a base station, gNB, etc.), etc. As described above, a TRP may be distinguished according to information (e.g., a CORESET index, a ID) on a CORESET group (or a CORESET pool). In an example, when one terminal is configured to perform transmission or reception with multiple TRPs (or cells), it may mean that multiple CORESET groups (or CORESET pools) are configured for one terminal. Such a configuration for a CORESET group (or a CORESET pool) may be performed through higher layer signaling (e.g., RRC signaling, etc.).

In addition, a base station may generally mean an object which performs transmission or reception of data with a terminal. For example, the base station may be a concept including at least one transmission point (TP), at least one transmission and reception point (TRP), etc. In addition, a TP and/or a TRP may include a panel of a base station, a transmission and reception unit, etc.

A terminal may receive configuration information from a base station S105. For example, the configuration information may include NTN-related configuration information/ configuration information for uplink transmission or reception (e.g., PUCCH-config/PUSCH-config)/a HARQ process-related configuration (e.g., whether HARQ feedback is enabled or disabled, the number of HARQ processes, etc.)/a CSI reporting-related configuration (e.g., a CSI report configuration (config)/CSI report quantity/a CSI-RS resource configuration (resource config), etc.), etc. described in the above-described embodiment (e.g., Embodiment 1, 2, and a combination of at least one of examples described in detailed embodiments thereof). For example, configuration information may include configuration information related to a configuration/an indication of a parameter for a time reference of a terminal, uplink transmission according to parameter application of a terminal and a time reference, reporting for an adjusted/updated time reference value, etc. For example, the configuration information may be transmitted through higher layer (e.g., RRC or a MAC CE) signaling.

For example, the above-described operation in S105 that a terminal (100 or 200 in FIG. 12) receives the configuration information from a base station (200 or 100 in FIG. 12) may be implemented by a device of FIG. 12 to be described below. For example, in reference to FIG. 12, at least one processor 102 may control at least one transceiver 106 and/or at least one memory 104, etc. to receive the configuration information, and at least one transceiver 106 may receive the configuration information from a network side.

A terminal may receive control information from a base station S110. For example, control information may include information related to a configuration/an indication related to update/reporting/application of a time reference adjustment value of a terminal. For example, control information may include configuration/indication information related to reception of a common TA parameter (or a CL TA parameter) or acquisition of a UE-specific TA parameter (or an OL TA parameter), scheduling information for application of a TA parameter, a BWP change or uplink transmission, etc.

For example, the above-described operation in S110 that UE (100 or 200 in FIG. 12) receives the control information from a base station (200 or 100 in FIG. 12) may be implemented by a device of FIG. 12 to be described below. For example, in reference to FIG. 12, at least one processor 102 may control at least one transceiver 106 and/or at least one memory 104, etc. to receive the control information, and at least one transceiver 106 may receive the control information from a base station.

A terminal may transmit uplink data/channel to a base station S115. For example, a terminal may transmit uplink data/channel to a base station based on the above-described embodiment (e.g., Embodiment 1, 2, 3 and a combination of at least one of examples described in detailed embodiments thereof), etc. For example, a terminal may determine an uplink transmission timing based on at least one of a common TA parameter (or a CL TA parameter) or a UE-specific TA parameter (or an OL TA parameter) and transmit to a base station an uplink signal/channel according to a determined uplink transmission timing.

For example, the above-described operation in S115 that a terminal (100 or 200 in FIG. 12) transmits uplink data/channel may be implemented by a device of FIG. 12 below. For example, in reference to FIG. 12, at least one processor 102 may control at least one memory 104, etc. to transmit the uplink data/channel.

As mentioned above, the above-described signaling of a base station/a terminal and embodiment (e.g., Embodiment 1, 2, 3, and a combination of at least one of examples described in detailed embodiments thereof) may be implemented by a device which will be described by referring to FIG. 12. For example, a base station may correspond to a first device 100 and a terminal may correspond to a second device 200, and the opposite case may be also considered in some cases.

For example, the above-described signaling and operation of a base station/a terminal (e.g., Embodiment 1, 2, 3, and a combination of at least one of examples described in detailed embodiments thereof) may be processed by at least one processor (e.g., 102, 202) in FIG. 12, and the above-described signaling and operation of a base station/a terminal (e.g., Embodiment 1, 2, and a combination of at least one of examples described in detailed embodiments thereof) may be stored in a memory (e.g., at least one memory (e.g., 104, 204) in FIG. 12) in a command/program (e.g., an instruction, an executable code) form for driving at least one processor (e.g., 102, 202) in FIG. 12.

General Device to which the Present Disclosure May be Applied

FIG. 12 illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal from a network, configuration information related to at least one timing advance (TA) parameter; and
calculating, by the terminal, a TA based at least on at least one common TA parameter of at least one configured TA parameter; and
performing, by the terminal, an uplink transmission based on the TA,
wherein a second common TA parameter of a second order is used for calculating the TA based on a first common TA parameter of a first order being used for calculating the TA, and the first order is lower than the second order,
wherein a first transmission period of the first common TA parameter is longer than a second transmission period of the second common TA parameter.

2. The method according to claim 1, wherein:
a third common TA parameter of a third order is used for calculating the TA based on the first common TA parameter and the second common TA parameter being used for calculating the TA, and the third order is higher than the second order.

3. The method according to claim 2, wherein the at least one common TA parameter is provided from the network as one set of:
a first set of the first common TA parameter,
a second set of the first common TA parameter and the second common TA parameter, or
a third set of the first common TA parameter, the second common TA parameter and the third common TA parameter.

4. The method according to claim 2, wherein the at least one common TA parameter includes that:
a default value is applied to the second common TA parameter based on the first common TA parameter being provided and the second common TA parameter being not provided for the terminal;
the default value is applied to each of the second common TA parameter and the third common TA parameter based on the first common TA parameter being provided and the second common TA parameter and the third common TA parameter being not provided for the terminal; or
the default value is applied to the third common TA parameter based on the first common TA parameter and the second common TA parameter being provided and the third common TA parameter being not provided for the terminal.

5. The method according to claim 2, wherein the at least one common TA parameter includes that:
at least one of the second common TA parameter or the third common TA parameter has a non-zero value based on the first common TA parameter having the non-zero value; or
the third common TA parameter has the non-zero value based on each of the first common TA parameter and the second common TA parameter having the non-zero value.

6. The method according to claim 2, wherein:
the first common TA parameter is a common TA parameter or a common delay parameter,
the second common TA parameter is a common TA drift parameter or a common delay drift parameter,
the third common TA parameter is a common TA drift variation or a common delay drift variation.

7. The method according to claim 2, wherein:
the second transmission period of the second common TA parameter is longer than a third transmission period of the third common TA parameter.

8. The method according to claim 1, wherein:
the TA includes a common TA,
the common TA is calculated based on at least one common TA parameter.

9. The method according to claim 1, wherein:
the TA includes a first TA ($N_{TA}$) related to a TA command, a second TA ($N_{TA,common}$) related to a common TA, and a third TA ($N_{TA,UE-specific}$) related to a UE-specific TA parameter.

10. The method according to claim 9, wherein:
at least one of the first TA, the second TA, or the third TA is determined based on subcarrier spacing of a changed active uplink BWP based on the active uplink bandwidth (BWP) being changed between a time of at least one of reception of the TA command, reception of the common TA parameter or acquisition of the UE-specific TA parameter and the time when the calculated TA is applied to an uplink transmission timing.

11. The method according to claim 9, wherein:

based on an active uplink BWP being changed after a time when the calculated TA is applied to an uplink transmission timing, at least one of the first TA of a same absolute value, the second TA of the same absolute value or the third TA of the same absolute value is applied before and after the active uplink BWP is changed.

12. The method according to claim 1, wherein:

the method is performed in a non-terrestrial network (NTN) system.

13. A terminal comprising:

at least one transceiver; and at least one processor connected to the at least one transceiver, wherein the at least one processor is configured to:

receive configuration information related to at least one timing advance (TA) parameter from a network through the at least one transceiver;

calculate a TA based at least on at least one common TA parameter of the at least one configured TA parameter; and perform an uplink transmission based on the TA through the at least one transceiver, wherein a second common TA parameter of a second order is used for calculating the TA based on a first common TA parameter of a first order being used for calculating the TA, and the first order is lower than the second order, wherein a first transmission period of the first common TA parameter is longer than a second transmission period of the second common TA parameter.

14. A base station comprising:

at least one transceiver; and at least one processor connected to the at least one transceiver, wherein the at least one processor is configured to:

transmit configuration information related to at least one timing advance (TA) parameter to at least one terminal through the at least one transceiver; and receive through the at least one transceiver from each terminal uplink transmission to which a TA calculated based at least on at least one common TA parameter of at least one configured TA parameter is applied, wherein a second common TA parameter of a second order is used for calculating the TA based on a first common TA parameter of a first order being used for calculating the TA, and the first order is lower than the second order, wherein a first transmission period of the first common TA parameter is longer than a second transmission period of the second common TA parameter.

* * * * *